United States Patent [19]

Hasegawa

[11] Patent Number: 4,924,269
[45] Date of Patent: May 8, 1990

[54] ORIGINAL ILLUMINATING APPARATUS
[75] Inventor: Hirofumi Hasegawa, Osaka, Japan
[73] Assignee: Minolta Camera Kabushiki Kaisha, Osaka, Japan
[21] Appl. No.: 263,818
[22] Filed: Oct. 28, 1988
[30] Foreign Application Priority Data
  Oct. 28, 1987 [JP] Japan .............................. 62-165938[U]
  Oct. 28, 1987 [JP] Japan .............................. 62-165939[U]
[51] Int. Cl.⁵ ...................... G03G 15/00; G03G 15/04
[52] U.S. Cl. .................................... 355/229; 355/218;
        355/219; 355/220; 355/232; 355/296; 355/326
[58] Field of Search ............... 355/229, 232, 218, 296,
                                        355/219, 220, 326; 346/108

[56] References Cited

U.S. PATENT DOCUMENTS

| 4,009,954 | 3/1977 | Ritzerfeld | 355/230 X |
| 4,171,905 | 10/1979 | Boschet | 355/228 X |
| 4,519,698 | 5/1985 | Kohyama et al. | 355/297 X |
| 4,576,462 | 3/1986 | Lehman | 355/229 |
| 4,717,925 | 1/1988 | Shibata et al. | 346/108 |

FOREIGN PATENT DOCUMENTS

| 52-4109 | 1/1977 | Japan . |
| 55-6322 | 1/1980 | Japan . |
| 59-189365 | 10/1984 | Japan . |
| 60-172013 | 9/1985 | Japan . |
| 61-18163 | 5/1986 | Japan . |
| 61-279869 | 12/1986 | Japan . |

Primary Examiner—A. C. Prescott
Attorney, Agent, or Firm—Price, Gess & Ubell

[57] ABSTRACT

A plurality of illuminating lights are positioned adjacent a document table for illuminating an original with different color light. A holding member is capable of not only rotating the individual light sources but also moving a specific light source outward to assume an advantageous position for illuminating the document. A cam mechanism can be utilized for automatically positioning the light source as it approaches the desired illumination position.

16 Claims, 5 Drawing Sheets

ORIGINAL ILLUMINATING APPARATUS

BACKGROUND OF THE INVENTION

1. Technical Field of the Invention

The present invention relates to an original illuminating apparatus for use in a copying machine, image reader and the like for copying and reading an image of an original, and more particularly to an original illuminating apparatus which can be used by changing a plurality of light sources for copying and reading color images by decomposing colors into each color required.

2. Brief Description of the Prior Art

A color decomposition method is used when a color image of an original is copied in color or when the color image is read as an image signal and provided with color data. Generally, two methods of decomposition are utilized, a first method being performed by using a white light source and a color decomposition filter in combination and a second method by jointly installing a plurality of light sources provided with different spectra distribution.

In the first method, all the light from a light source can not be utilized excepting only that part of the light which penetrates a filter. The effective availability of light is, therefore, low and several times more light amount is required at the light source than when it is used without a filter thus inviting an unfavorable tendency of increasing the consumption of electricity and calorific value.

In the second method, a plurality of light sources are provided jointly, however, the distance between the position that the light sources are disposed and an object to be illuminated becomes longer as a result of the space the light sources occupy. The light sources are thus separated more excessively away from an object to be illuminated than when there is only one light source, and the intensity of illumination is lowered by the square of the distance separated. It is necessary to increase the light amount of the light source by the intensity of illumination lowered. A sub-reflector is used to eliminate the shade of any bump made at the edge of an original when it is placed on an original table and illuminated for copying or reading the image. In this case, the same number of sub-reflectors as light sources has to be disposed at the positions corresponding to the light sources. Hence, an apparatus becomes larger in size and causes a corresponding rise in cost.

Japanese Published Unexamined patent application No. 189365/1984 discloses an illuminating apparatus which solves such problems.

As shown in FIG. 1, a plurality of light sources, a, b and c, are supported to rotatively move properly to an illuminating position. The light sources a, b and c are fixedly disposed on a rotating member d and are rotatively moved properly to the illuminating position in accordance with the rotation of the rotating member. When one of the light sources a, b or c is positioned at the illuminating position, two other light sources are evacuated from the illuminating position, and therefore, the light source being used may be moved nearer to an illuminating object on the limiting condition that the correlative rotation of a plurality of light sources a, b and c do not interfere with another component part. When every one of the light sources a, b and c are used, a sub-reflector e can be used in common since they are all at the illuminating position thereby restraining the apparatus from becoming large in size and complicated in structure to some extent.

However, in this light-source rotating system, a plurality of light sources a, b and c only be moved to the illuminating position by correlative rotation with the rotating member d and can not move more nearer to the illuminating object as compared with the case when each of the light sources a, b and c singularly can be located nearer to the illuminating object within the limit that each of them does not interfere with other operative parts. Accordingly, the light amount of the light sources has to be increased more than the case when one light source is used thereby increasing the consumption of electricity and calorific value.

SUMMARY OF THE INVENTION

The main object of the present invention is to provide an original illuminating apparatus capable of solving the aforementioned problems by positioning a plurality of light sources at proper positions without taking a large space by a rotative movement while being arranged to efficiently illuminate from a short distance by moving the position of the light source to a position nearer to the object to be illuminated.

Another object of the present invention is to provide an original illuminating apparatus capable of accomplishing the movement of one of a plurality of light sources which is rotatively moved to an illuminating position to a position nearer to the object to be illuminated by the guide of a cam with simple structure.

A further object of the present invention is to provide an original illuminating apparatus capable of functioning as an eraser also for erasing residual electric charge on a photoconductor in an electrophotographic copying machine by one of a plurality of light sources which is positioned out of an illuminating position.

The other objects and features of the present invention will become more apparent from the following description taken in conjunction with the accompanying drawings which illustrate specific embodiment of the invention.

BRIEF DESCRIPTION OF THE DRAWINGS

It is to be noted like parts and members are designated by like reference marks throughout the accompanying drawings and that a repeated description is omitted.

DETAILED DESCRIPTION OF THE INVENTION

Embodiments of the present invention will now be described below referring to the accompanying drawings.

Figure 2:
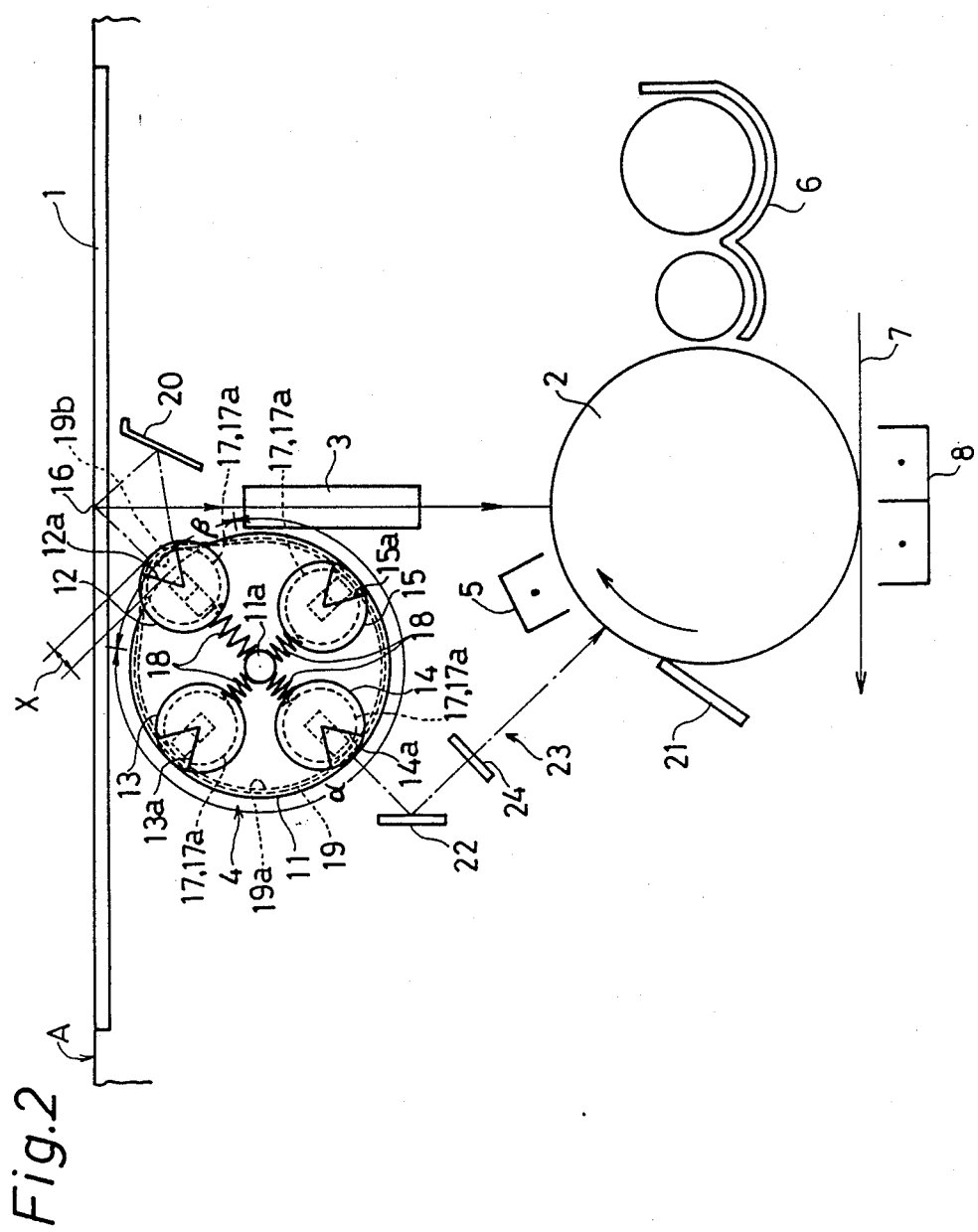
FIG. 2 is a diagramatic side view of an exposure/image forming section of a copying machine illustrating the first embodiment of the present invention to which a color copying machine is applied.
Figure 3:
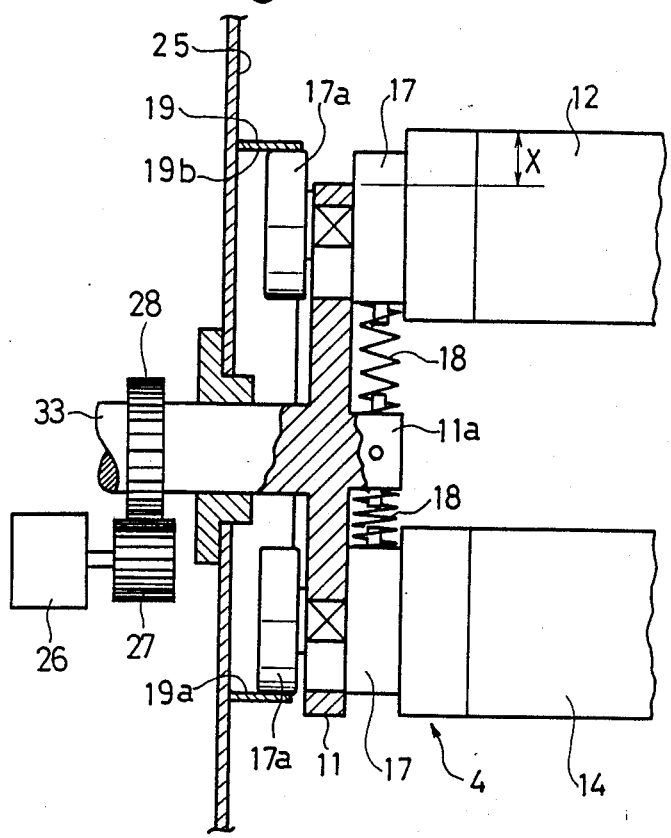
FIG. 3 is an enlarged sectional view showing a part of the illuminating apparatus in FIG. 2.

FIGS. 2 and 3 illustrate the first embodiment of the present invention which is applied to an original table movable type color copying machine.

On the upper surface of the main body A of a copying machine, an original glass table 1 which is reciprocatively driven is disposed with a photoconductive drum 2 inside the main body as shown in FIG. 2. Between the original glass table 1 and the photoconductive drum 2, both a light convergence lens array 3 and an illuminating apparatus 4 for illuminating an original on the glass table 1 are arranged. The image of an original placed on the glass table 1 is illuminated by the illuminating apparatus 4 under which the image is scanned by movement of the original glass table 1, and slit exposure is made onto the photoconductive drum 2 through the lens array 3.

Around the photoconductive drum 2, auxiliary, devices such as charger 5 and toner developing unit 6 are provided to form an image forming section. The photoconductive drum 2 is rotatively driven in the direction of the arrow in FIG. 2 simultaneously in correlative movement of the original glass table 1, and an electrostatic latent image is formed for the image of the original exposed. Then, the electrostatic latent image is visualized as toner image through a developing procedure. The toner image on the photoconductive drum 2 is electrostatically transferred by a transfer charger 8 onto a transfer sheet 7 simultaneously transported, and thereafter the transferred image is fixed on the transfer sheet 7 through a fixing procedure.

In an illuminating apparatus 4, fluorescent lamps of red, green, blue and white 12, 13, 14, 15 are spaced on a rotary disk 11 and are movably held in the radial direction of the rotary disk 11 in an intensive arrangement within a small range. The illuminating apparatus is also arranged to be positioned as near as possible to an illuminating point 15 without interfering with the glass table 1 and the lens array 3 when apertures 12a, 13a, 14a, 15a are rotatively moved to an illuminating point 16 by the rotation of the rotary disk 11. The fluorescent lamps 12, 13, 14, 15 are movably supported in the radial direction on the circular plate 11 by attaching the edges to sockets 17 which are also arranged to be movable in the radial direction on the rotary disk 11, and further those lamps are biased in the centrifugal direction by a spring 18 which is provided between the sockets 17 and a protruded portion 11a of the rotary disk 11.

The positions in the radial direction of each fluorescent lamps 12, 13, 14, 15 biased in the centrifugal direction are indirectly regulated by the positional regulation of sockets 17 with a cam ring 19 fixed to side plate 25 which is provided for positioning around the outside of a group of rings 17a connected to each socket 17.

The cam ring 19 is provided with a circular arc guide surface 19a for regulating the positions of each socket 17 in order to have each fluorescent lamps 12, 13, 14, 15 moved rotatively in a radius as small as possible to an illuminating position when they are within a range of rotative movement α, i.e. out of the illuminating position. The cam ring 19 is further provided with an eccentric circular arc guide surface 19b within a range of rotative movement β including the illuminating position. Each of the fluorescent lamps 12, 13, 14, 15, when entering into the range β from the range α, reaches the illuminating position wherein each one of them singularly protrudes the distance by X to locate at the nearest accessible position to the illuminating point 16, whereas each of them, when returning to the range α by gradually getting out of the illuminating position, is guided to push back the distance by X from the protruded position. Each of the lamps, when moving in the range α, does not interfere with the glass table 1 and lens array 3 at all.

Accordingly, once the rotary disk 11 is rotatively driven, each one of the fluorescent lamps 12, 13, 14, 15 is rotatively moved to the proper illuminating position without interfering with the original glass table and lens array 3 by the guide of the cam ring 19 through the sockets 17 and is utilized for illuminating an original. At the illuminating position, it can be moved singularly to the nearest accessible position to the illuminating point 16, so that the light amount required for the fluorescent lamps 12, 13, 14, 15 to obtain an aimed illumination at the illuminating point 16 may be reduced by the distance the light source is accessible, thereby lowering the consumption of electricity and calorific value.

To the rotary disk 11, a stepping motor 26 is connected to its axis of rotation 33 through gears 27, 28 and the fluorescent lamps 12, 13, 14, 15 can selectively be moved to the proper illuminating position by rotative control of the motor 26. One sub-reflector 20 may be utilized for common use of the fluorescent lamps 12, 13, 14, 15 since the illuminating position is set at one place as shown in the figure.

In the embodiment described above, it is arranged to singularly move each one of the fluorescent lamps 12, 13, 14, 15 to the nearest position of the illuminating point 16 when they are at the illuminating position, however, it may be arranged, though it depends on the number of fluorescent lamps to be used, to move the whole structure of the illuminating apparatus 4 to the nearest accessible position of the illuminating point after rotatively moving a desired fluorescent lamp to the illuminating position. In this case, it is preferable to remove the unnecessary protrusion on the rotating member which support the fluorescent lamps 12, 13, 14, 15.

Figure 1:
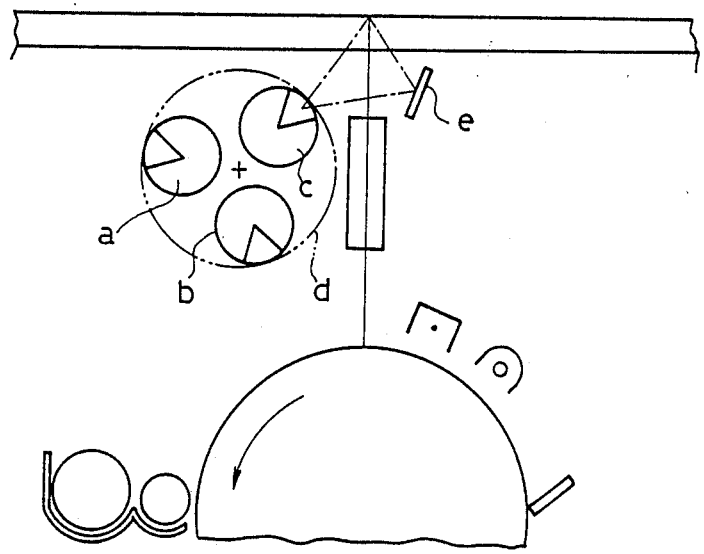
FIG. 1 is a side view showing an original illuminating apparatus in a part of an exposure/image forming section of a conventional copying machine.

The light emitting from one of the fluorescent lamps 12, 13, 14, 15 positioned opposite to the illuminating position is directed to the surface of the photoconductive drum 2 through a reflector 22 for erasing residual charger thereon after completion of image transfer by a transfer charger 8 and cleaning by a cleaner 21. Accordingly, the light source exclusively provided for erasing the photoconductive drum 2 in a conventional apparatus becomes unnecessary. A filter 24 may also be provided on the erasing light path 23 for regulating the light amount emitted from each one of the light sources 12, 13, 14, 15 as shown in FIG. 1 depending on the situation.

Figure 4:
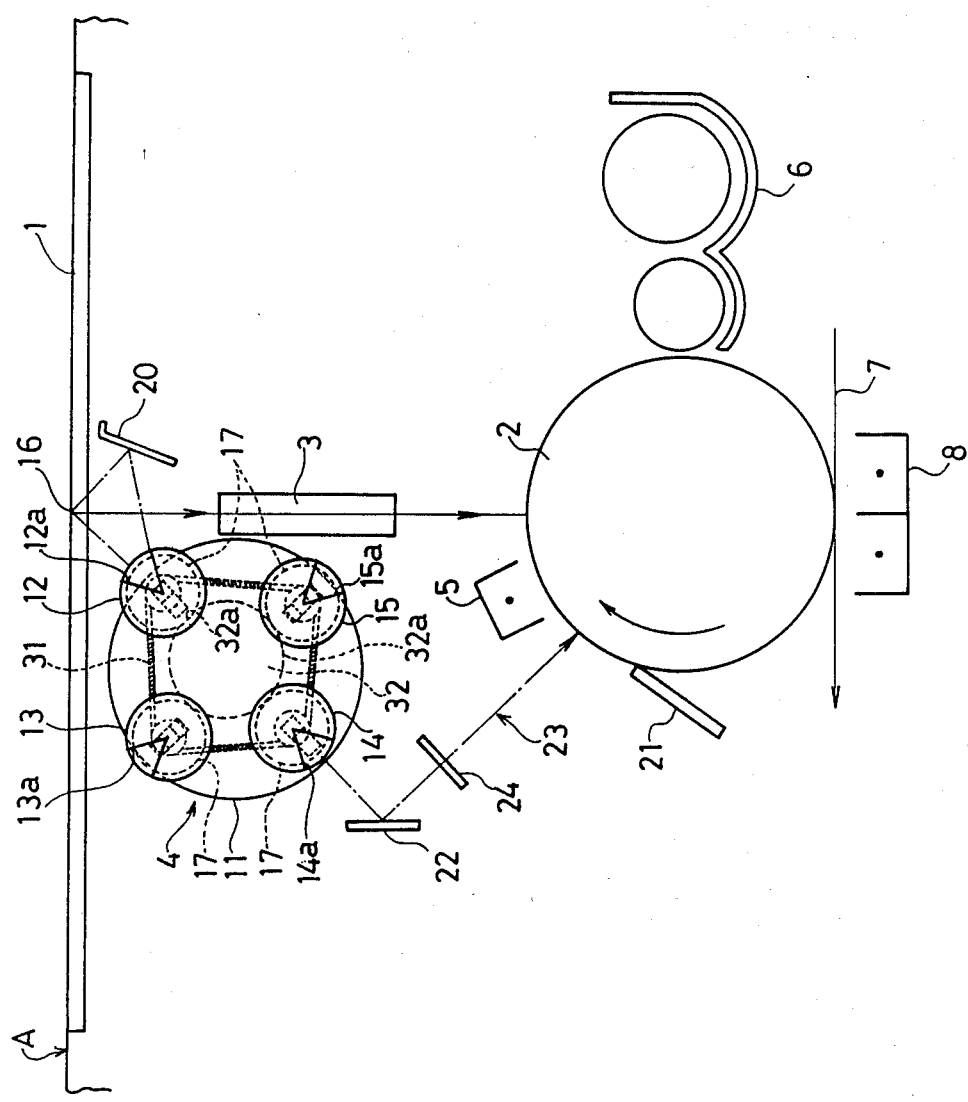
FIG. 4 is a diagramatic side view showing an exposure/image forming section of a copying machine which is applied to the second embodiment of the present invention.
Figure 5:
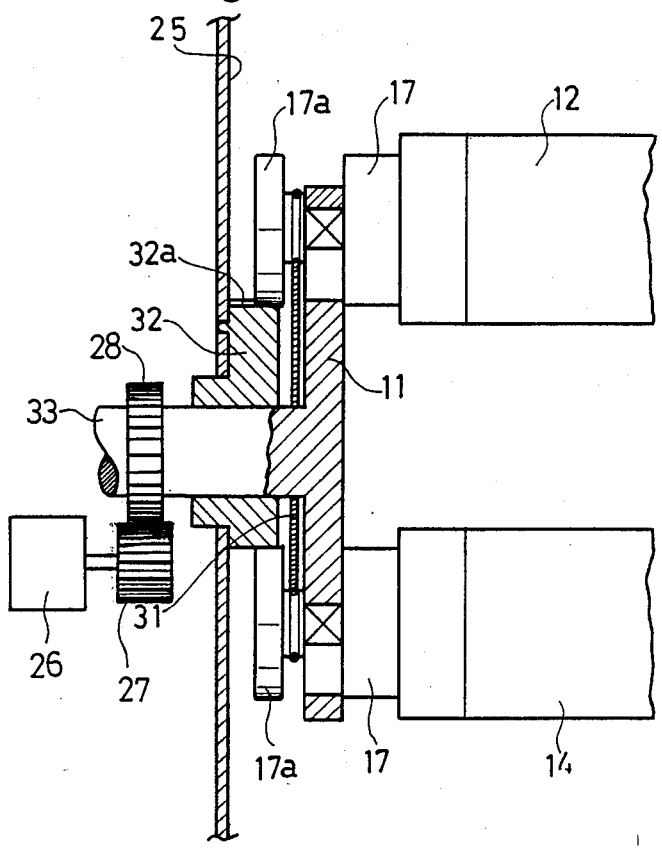
FIG. 5 is an enlarged sectional view showing a part of the illuminating apparatus in FIG. 4.

FIGS. 4 and 5 illustrate the second embodiment of the present invention wherein the moving means of light sources in an illuminating apparatus 4 differs from the previous embodiment, which will now be descried below.

Each one of fluorescent lamps 12, 13, 14, 15 is held on a rotary disk 11 as in the first embodiment and are biased in the centripetal direction by a coil-spring flexible belt 31 wound around the outside of each socket 17 to which each one of the fluorescent lamps 12, 13, 14, 15 is attached.

The circumferential surface 32a of an eccentric cam 32 fixed to a side plate 25 to be in the center of a group of the sockets 17 is pressed to contact with rings 17a connected to the sockets 17, and the cam 32 is arranged to regulate the positions in the radial direction of each fluorescent lamps 12, 13, 14, 15 through the sockets 17. The eccentric cam 32 is also utilized as a bearing of the axis of rotation 33 of a rotary disk 11.

The cam 32 is provided with a concave section 32a to stabilize the position of the fluorescent lamps 12, 13, 14, 15 at the illuminating position in this embodiment. Thus, once the rotary disk 11 is rotatively driven, the fluorescent lamps are rotatively moved in locus along the surface of cam 32a by the guide of the circumferential surface 32a of the cam 32 through the sockets 17, and then moved to an illuminating position properly. When it is moved nearer to the illuminating position, the rotating locus is restrained in the centrifugal direction and approaches most close to the illuminating point 16 in the illuminating position. Conversely, when it moves away from the illuminating position, the rotating locus is restrained in the centripetal direction. Accordingly the rotating locus accomplishes a rotating movement without interfering with the glass table 1 and lens array 3 and provides a close approach to the illuminating point 16 in the illuminating position. White light source is utilized in the embodiment, however, it may be omitted.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An original illuminating apparatus for copying or image reading, comprising:
   a plurality of light sources having respectively different spectral distributions:
   a holding means for supporting a plurality of light sources in a manner that is rotatively movable;
   a first moving means for rotatively moving each one of the light sources to position a desired light source at an original illuminating position; and
   a second moving means for moving the desired light source to an original illuminating point when the desired light source is positioned at an illuminating position.

2. An original illuminating apparatus as defined in claim 1, wherein the holding means is a rotating member which holds a plurality of light sources on a same circle with its center at the center of rotation and is rotatively driven by the first moving means.

3. An original illuminating apparatus as defined in claim 2, wherein the second moving means includes a cam disposed inside or outside of the locus rotative movement of a plurality of light source held on the rotating member and an energizing means for correlatively moving the light source with the cam.

4. An original illuminating apparatus as defined in claim 2, wherein the second moving means moves the light source at the illuminating position correlatively with the holding member.

5. A copying machine, comprising:
   an original table for holding an original;
   an original illuminating means having a plurality of light sources provided with different spectra distribution for illuminating an original and a moving means for selectively moving each light source to an illuminating position;
   a first optical system for directing a reflected light from an original onto the photoconductive member for exposure;
   an image forming means for forming an image upon receiving the image exposure on a photoconductive member and transferring the image on a transfer member; and
   a second optical system for erasing residual electric charge on the photoconductive member by directing a light from a light source positioned different from an original illuminating location.

6. A copying machine as defined in claim 5, wherein an original illuminating means is provided with a holding means for holding a plurality of light sources in a manner rotatively movable on a same circle and a light-source moving means which is equipped with a first moving means for rotatively moving each one of the light sources to position a desired light source at an original illuminating position and a second moving means for moving a desired light source to an original illuminating point when the desired light source is positioned at an illuminating position.

7. A copying machine as defined in claim 6, wherein the holding means is a rotating member which holds a plurality of light sources on a same circle with its center at the center of rotation, and is rotatively driven by the first moving means.

8. A copying machine as defined in claim 7, wherein the second moving means consists of a dam disposed inside or outside of the locus of rotative movement of a plurality of light sources held on the rotating member and an energizing means for correlatively moving a light source with the cam.

9. A copying machine as defined in claim 7, wherein the second moving moves the light source at the illuminating position correlatively with the holding member.

10. In a photocopying machine having a photoconductive member for receiving an image wherein the photoconductive member cooperates with a charging station and a toner developing unit to develop the image, the improvement comprising:
    an erasing unit for directing light to erse images on the photoconductive member including a light source that is mounted to be relatively movable towards and away form the photoconductive member.

11. An improved illuminating apparatus for developing an image from an original in a photocopier having a photoconductive member and a support table for the original, comprising:
    a support member;
    a plurality of separate light members, movably mounted on the support member, and
    means for selectively moving one of the light members to an exposure position adjacent the support table while positioning the other light members apart from the exposure position.

12. The illuminating apparatus of claim 11 further including means for directing light from one of the other light members towards the photoconductive member for erasing the photoconductive member surface.

13. The illuminating apparatus of claim 12 wherein the directing means includes a filter member for providing a predetermined wavelength of light for erasing.

14. The illuminating apparatus of claim 12 wherein the support member is rotatably mounted.

15. The illuminating apparatus of claim 14 wherein the light members are radially movable mounted on the support member.

16. In a photocopying machine having a photoconductive member for receiving an image wherein the photoconductive member cooperates with a charging station and a toner developing unit to develop the image, the improvement comprising:

a light apparatus having a plurality of separate light sources, at least one of the light sources forming a component of an erasing unit for directing light to erase image on the photoconductive member, the light apparatus being mounted to move whereby the separate light sources can be respectively positioned in operative relationships with the photoconductive member.

* * * * *